(12) United States Patent
Lamb

(10) Patent No.: US 9,915,282 B2
(45) Date of Patent: Mar. 13, 2018

(54) STACKED CAPS WITH CONNECTING STEMS

(75) Inventor: Frederick W. Lamb, McDonald, PA (US)

(73) Assignee: PneuTools, Incorporated, Memphis, TN (US)

( * ) Notice: Subject to any disclaimer, the term of this patent is extended or adjusted under 35 U.S.C. 154(b) by 234 days.

(21) Appl. No.: 13/490,359

(22) Filed: Jun. 6, 2012

(65) Prior Publication Data
US 2013/0330150 A1 Dec. 12, 2013

(51) Int. Cl.
*F16B 43/00* (2006.01)
*E04D 15/04* (2006.01)

(52) U.S. Cl.
CPC ........ *F16B 43/00* (2013.01); *E04D 2015/045* (2013.01)

(58) Field of Classification Search
CPC ....... B25C 1/006; B25C 5/1693; E04D 15/04; E04D 5/145; E04D 2015/045; F16L 315/08; E04C 15/04; F16B 43/00; F16B 15/08; F16B 5/0233; F16B 27/00
USPC ........ 411/531, 442, 443, 445, 546; 206/338, 206/445, 303, 348
See application file for complete search history.

(56) References Cited

U.S. PATENT DOCUMENTS

| | | | |
|---|---|---|---|
| 230,632 A * | 8/1880 | Hubbard | F16B 15/08 206/338 |
| 239,111 A | 3/1881 | O'Meara | |
| 409,548 A * | 8/1889 | Zeigler | 411/546 |
| 853,005 A * | 5/1907 | Dawkins | 411/164 |
| 1,560,938 A | 11/1925 | Lund | |
| 1,590,172 A | 6/1926 | Thorberg | |
| 2,052,063 A | 8/1936 | Wenn | |
| 2,366,510 A * | 1/1945 | Frank | F16B 19/06 206/343 |
| 2,385,521 A | 9/1945 | Mead | |
| 2,886,815 A | 5/1959 | Young | |
| 2,939,147 A | 6/1960 | Jacobson | |
| 3,180,489 A | 4/1965 | McGinn | |
| 3,339,720 A | 9/1967 | Barnes | |
| 3,595,460 A | 7/1971 | Pitkin | |
| 3,604,608 A | 9/1971 | Mullaney | |
| 3,633,810 A | 1/1972 | Krakauer | |
| 3,734,377 A | 5/1973 | Munn | |
| 4,033,499 A | 7/1977 | Butler | |
| 4,039,078 A | 8/1977 | Bone | |
| 4,194,621 A | 3/1980 | Lange | |
| 4,251,017 A | 1/1981 | Doyle et al. | |
| 4,300,684 A | 11/1981 | Smith | |
| D263,927 S | 4/1982 | Dewey | |
| 4,339,065 A | 7/1982 | Haytayan | |

(Continued)

Primary Examiner — Flemming Saether
(74) Attorney, Agent, or Firm — Walker, McKenzie & Walker, P.C.

(57) ABSTRACT

A plurality of stacked fastener caps, each having a cap body. The cap body has first and second faces joined by a perimeter of the cap body, and adjacent faces of adjacent caps are joined by at least one connecting stem. The adjacent caps and connecting stems are integrally molded as a unit as by injection molding. One or both of the first and second faces may be planar. One of the first or second faces may be concave and the other may be convex. One or both of the first and second faces may have first and second thicker portions with a transverse groove interposed therebetween.

2 Claims, 3 Drawing Sheets

(56) References Cited

U.S. PATENT DOCUMENTS

| | | | |
|---|---|---|---|
| 4,377,361 A * | 3/1983 | Frieberg | 411/161 |
| 4,424,929 A | 1/1984 | Weis | |
| 3,261,526 A | 7/1986 | Novak | |
| 4,662,974 A | 5/1987 | Roberts | |
| 4,686,808 A | 8/1987 | Triplett | |
| 4,726,164 A | 2/1988 | Reinwall et al. | |
| 4,780,039 A | 10/1988 | Hartman | |
| 4,811,861 A | 3/1989 | Roberts | |
| 4,890,968 A | 1/1990 | Beach et al. | |
| 4,971,502 A * | 11/1990 | Oh | 411/340 |
| 5,042,142 A | 8/1991 | Beach et al. | |
| 5,069,589 A | 12/1991 | Lemke | |
| 5,082,412 A | 1/1992 | Thomas | |
| 5,110,247 A | 5/1992 | Losada | |
| 5,163,580 A | 11/1992 | Beach | |
| 5,178,503 A | 1/1993 | Losada | |
| 5,184,752 A | 2/1993 | Zylka et al. | |
| 5,242,355 A | 9/1993 | Costa | |
| 5,261,770 A | 11/1993 | Hoepker et al. | |
| 5,347,707 A | 9/1994 | Beach | |
| 5,407,313 A | 4/1995 | Bruins et al. | |
| 5,445,297 A | 8/1995 | Beach et al. | |
| 5,507,388 A | 4/1996 | Kildal et al. | |
| 5,529,451 A | 6/1996 | Bruins et al. | |
| 5,634,583 A | 6/1997 | McGuinness et al. | |
| 5,755,545 A | 5/1998 | Banks | |
| 5,791,546 A | 8/1998 | McGuinness et al. | |
| 5,921,454 A | 7/1999 | Larson et al. | |
| 5,927,497 A | 7/1999 | Baumgartner | |
| 5,927,922 A | 7/1999 | Miller | |
| 5,934,504 A | 8/1999 | Elliott | |
| 5,947,362 A | 9/1999 | Omli | |
| 6,010,291 A | 1/2000 | Schwingle | |
| 6,065,660 A | 5/2000 | Cabrera | |
| 6,082,942 A * | 7/2000 | Swick | 411/368 |
| 6,176,666 B1 * | 1/2001 | Osterlund | 411/535 |
| 6,229,764 B1 | 5/2001 | Tongue | |
| 6,302,310 B1 | 10/2001 | Lamb | |
| 6,363,679 B1 * | 4/2002 | Rutherford | 52/681 |
| 6,481,610 B1 | 11/2002 | Liu et al. | |
| 6,502,719 B2 | 1/2003 | Huang | |
| 6,550,660 B1 | 4/2003 | Chlebowski et al. | |
| 6,640,968 B2 * | 11/2003 | Selle | 206/303 |
| 6,669,428 B2 | 12/2003 | Autterson et al. | |
| 6,966,389 B1 | 11/2005 | Riggs | |
| 7,090,455 B2 | 8/2006 | Lamb | |
| 7,093,714 B2 * | 8/2006 | Huang | 206/493 |
| 7,207,095 B2 | 4/2007 | Bruins et al. | 29/453 |
| 7,381,102 B2 * | 6/2008 | Camacho | 439/801 |
| D593,391 S | 6/2009 | Lamb | |
| 2003/0057248 A1 | 3/2003 | Bruins et al. | |
| 2004/0118732 A1 * | 6/2004 | Lee | 206/445 |
| 2005/0129487 A1 * | 6/2005 | Kelly | 411/533 |
| 2006/0289318 A1 | 12/2006 | Gelardi et al. | |
| 2007/0175170 A1 * | 8/2007 | Shah | 52/741.1 |
| 2008/0047853 A1 | 2/2008 | Hassdenteufel et al. | |

* cited by examiner

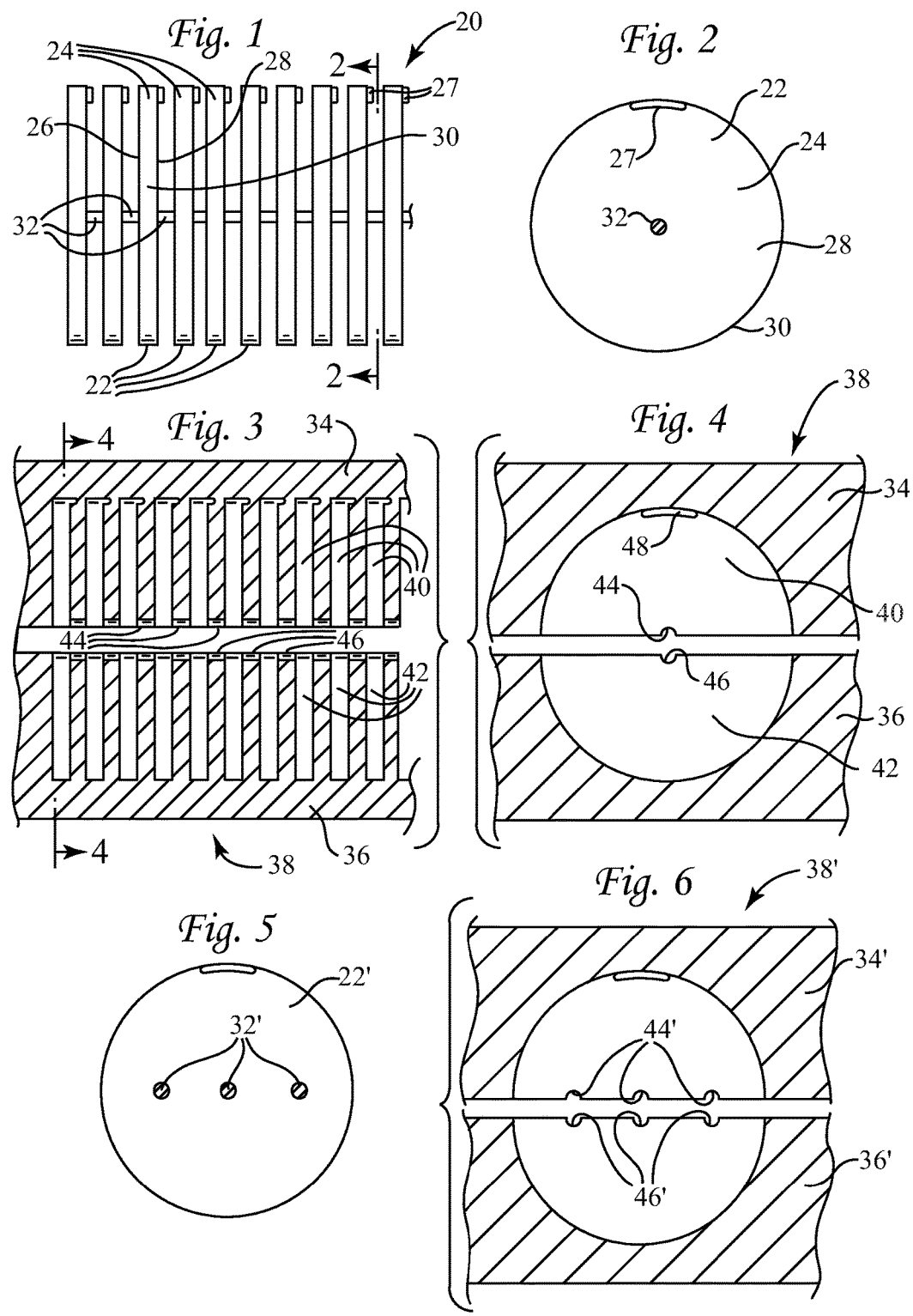

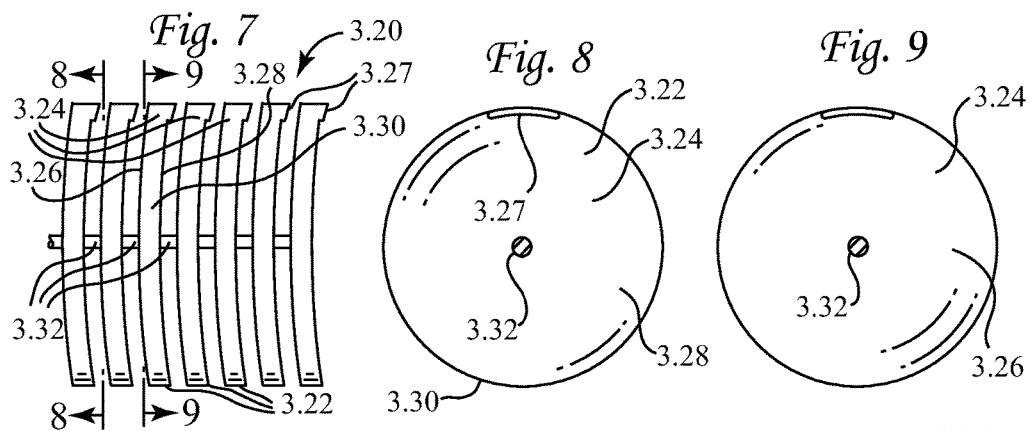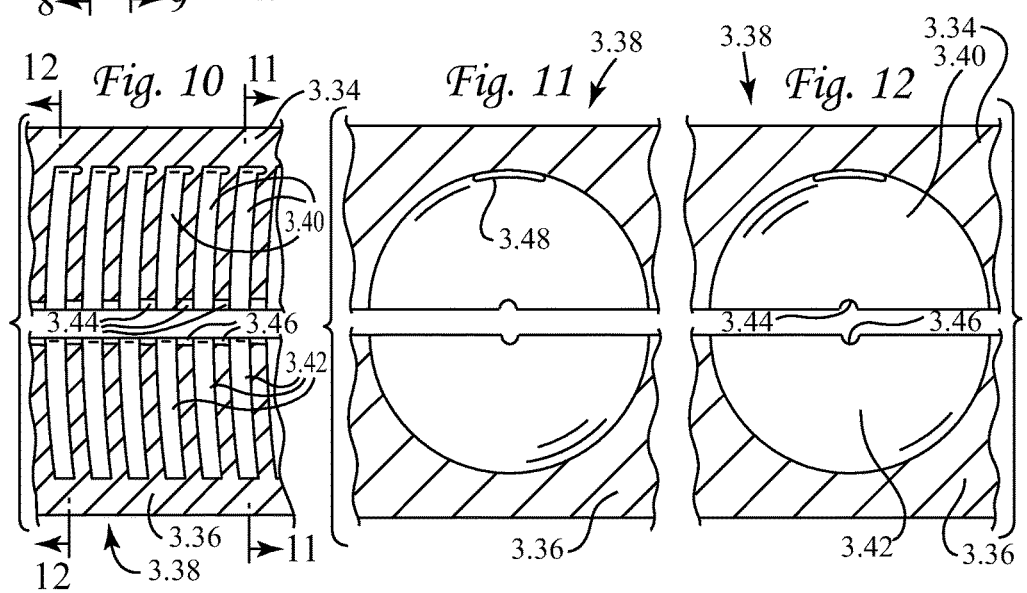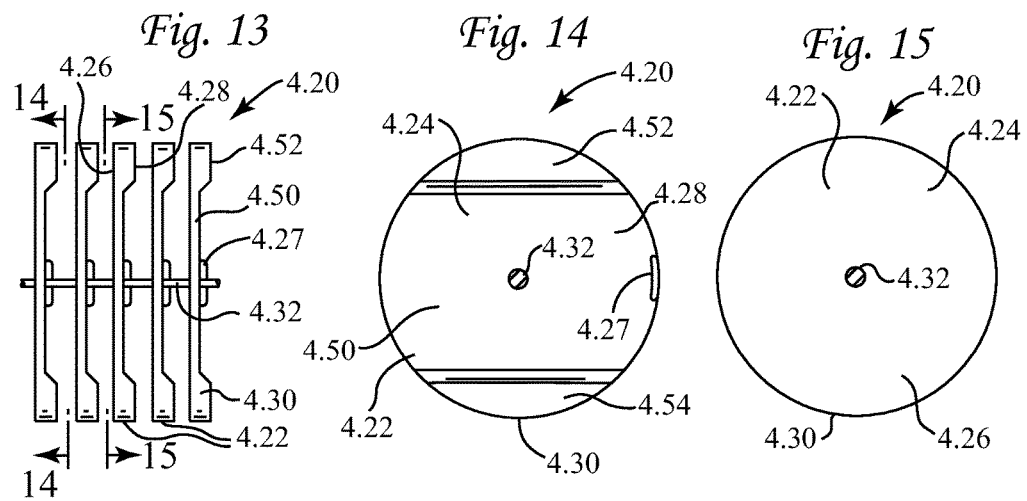

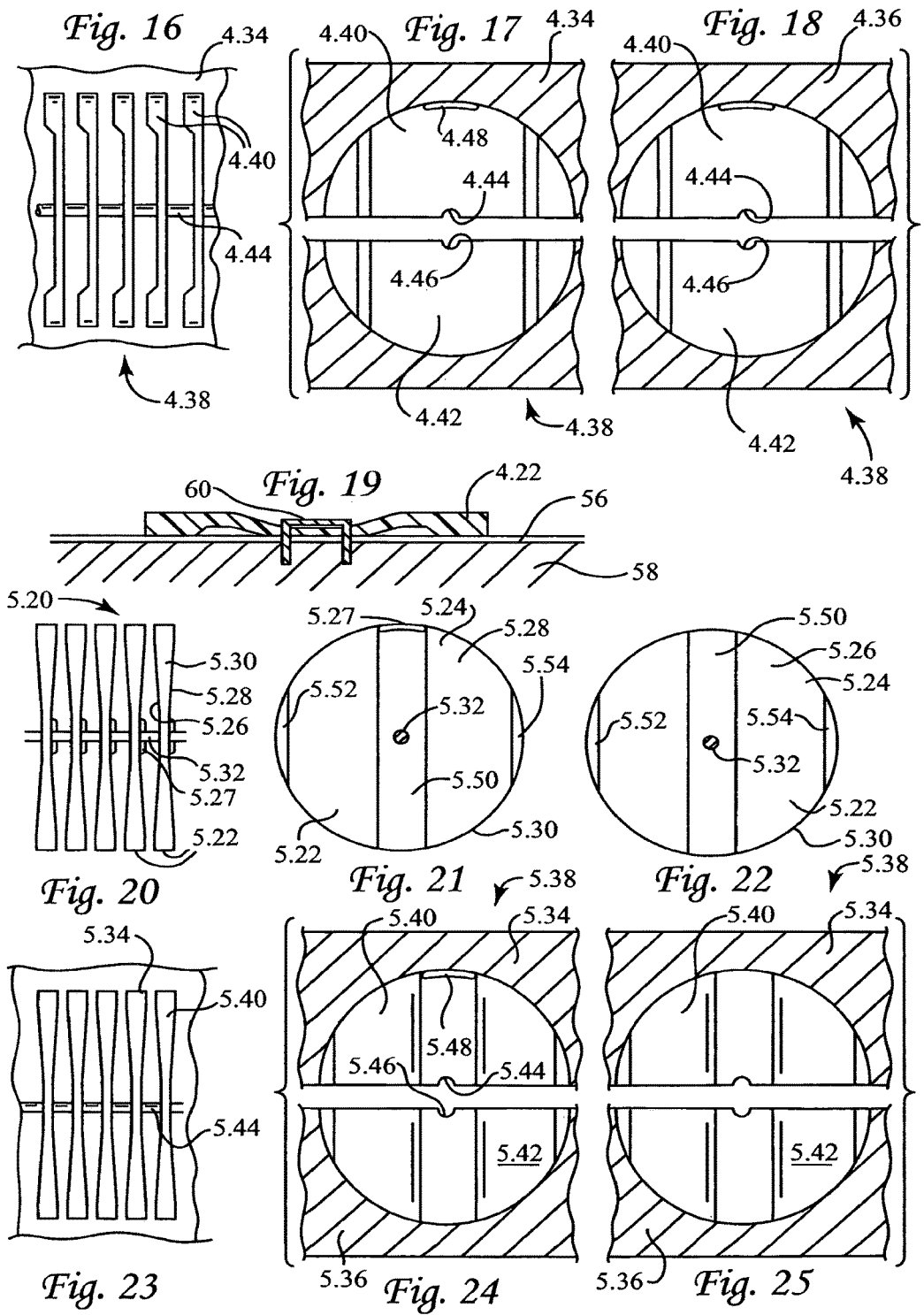

STACKED CAPS WITH CONNECTING STEMS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO COMPACT DISC(S)

Not applicable.

BACKGROUND OF THE INVENTION

1. Field of the Invention

The present invention relates, in general, to fasteners and fastener caps used as washers for holding roofing paper, insulation wrap, and coverings to houses, lumber, and other articles in the construction industry, and, in particular, to stacks of such fastener caps that are loaded into magazines used in manual staplers and fastener applicators in the construction industry.

2. Description of Related Art

A conventional cap feeding device generally includes a cap container and a base having a channel. The base extends between the cap container and a position under the nose of the nail gun. Caps are fed into the channel of the base from the cap container and pushed to the position under the nose of the nail gun. When the gun is triggered, a nail penetrates and dislodges the cap under the nose of the nail gun and protrudes into the underlying roof structure. The feeding of the caps under the nose of the nail gun is coordinated with the ejection of the nails through the nose of the nail gun, so that a cap is placed under the nose of the gun before the gun is triggered to expel a nail. Well-known cap feeding and nailing devices, and stacked assemblies of roofing caps for use therein, are disclosed in Lamb, U.S. Pat. No. 7,090,455 (issued Aug. 15, 2006; hereinafter, the "Lamb patent"), fully incorporated by reference herein. The coaxially-stacked caps disclosed in this Lamb patent have the advantage that a stack of caps can be quickly loaded into the nailer's magazine as a stacked unit, rather than being inserted one-by-one into the magazine.

Many approaches are known in the prior art for quickly loading a stack of fastener caps into the nailer's magazine. Some approaches use an axially-disposed longitudinal rod or string to hold the stack of caps together while inserting the stack of caps into the nailer's magazine, and then the rod or string is removed, leaving the stack of caps in the magazine. Because there is nothing holding adjacent caps together after the rod or string is removed, these approaches have the disadvantage that, once inserted into the magazine, the caps cannot be removed without becoming unstacked, making reinsertion into the magazine very difficult as the caps have to be re-inserted one by one.

One embodiment of stacked caps disclosed in the Lamb patent, namely, the fifth embodiment shown in FIGS. 20-24 of the Lamb patent, has been shown to be a great improvement over the prior art. In this embodiment, a stacked assembly of caps is placed into a sled and then portions of the outer circumference of adjacent caps in the stack are melted together as by heating with hot air or by using a laser. As a bottommost cap is ejected from the magazine by a well-known pusher, the bottommost cap is sheared from the stack of caps and is then moved into position in the nailer and subsequently nailed. Because portions of the outer circumference of adjacent caps remain melted together until sheared apart during nailing, the stack of caps can readily be removed as a unit from the nailer's magazine and will still remain together as a stacked assembly of caps, thereby permitting easy reinsertion of the stack of caps into the magazine.

While this assembled stack of caps, with portions of the outer circumference of adjacent caps being melted together, has been shown to be a great improvement over the prior art, it is rather labor intensive to manufacture. The caps are individually molded using well-known injection molding techniques, and, when the halves of the injection mold separate and the caps are ejected from the mold using well-known ejector pins in the mold, the caps are ejected onto a screen or plate below the mold. The ejected caps then have to be manually gathered and inserted as a stack into a sled so that portions of the outer circumference of adjacent caps can be melted together as by heating with hot air or by using a laser, using the technique disclosed in the Lamb patent.

It is therefore desirable to have an improved assembly of stacked caps that do not have to be manually gathered and inserted as a stack into a sled for becoming joined together.

A prior art approach is known for joining a sequence of fastener caps in a linear string, as disclosed in Omli, U.S. Pat. No. 5,947,362 (issued Sep. 7, 1999; hereinafter the "Omli patent"), fully included herein by reference. FIG. 13 of the Omli patent shows a linear string of fastener caps that are molded as a continuous strip in which a connecting piece connects the perimeter of one cap to the perimeter of an adjacent cap. While such continuous linear strips of fastener caps have the advantage that the strip can be molded as a unit without excessive manual assembly, such continuous linear strips of fastener caps have the great disadvantage that they must be fed from a bulky spool, rather than from a compact magazine as preferred by the construction industry, thereby requiring a complex and bulky feed mechanism as disclosed in the Omli patent.

It is therefore desirable to have an improved assembly of stacked caps that can be injection molded as a unit, and which are stacked rather than being in a continuous linear strip.

BRIEF SUMMARY OF THE INVENTION

The present invention is a coaxially-stacked assembly of fastener caps having shearable connecting stems between adjacent caps, in which the stacked assembly of fastener caps can be molded as an integral stacked unit.

It is an object of the present invention to provide a coaxially-stacked assembly of fastener caps in which the stacked assembly of fastener caps can be molded as an integral stacked unit.

BRIEF DESCRIPTION OF THE SEVERAL VIEWS OF THE DRAWING

FIG. 1 is a side view of stacked caps of a first embodiment of the present invention, which is substantially cylindrically symmetric.

FIG. 2 is a view of a bottom or second face of a cap of the first embodiment of the present invention, taken along the line 2-2 shown in FIG. 1. The view of the top or first face is the same as shown in FIG. 2 except for the omission of the "draft" or "ridge" portion on the top face.

FIG. 3 is a simplified sectional view of the halves of the injection mold used to make the first embodiment of the present invention, shown separated with the caps removed, and with injection passageways and ejector pins being omitted in the drawing figure for purposes of simplicity.

FIG. 4 is a right-facing transverse sectional view of the injection mold used to make the first embodiment of the present invention, taken along the line 4-4 shown in FIG. 3. The left-facing transverse sectional view of the injection mold is similar to the view shown in FIG. 4 except for the omission of the mold cavity for the "draft" or "ridge" portion shown in FIG. 4.

FIG. 5 is a view of a cap of a second embodiment of the present invention.

FIG. 6 is a right-facing transverse sectional view of the halves of the injection mold used to make the second embodiment of the present invention, similar to the view of FIG. 4.

FIG. 7 is a side view of stacked caps of a third embodiment of the present invention, which is substantially cylindrically symmetric.

FIG. 8 is a view of a bottom or second face of a cap of the third embodiment of the present invention, taken along the line 8-8 shown in FIG. 7.

FIG. 9 is a view of a top or first face of a cap of the third embodiment of the present invention, taken along the line 9-9 shown in FIG. 7.

FIG. 10 is a simplified sectional view of the injection mold used to make the third embodiment of the present invention, shown separated with the caps removed, and with injection passageways and ejector pins being omitted in the drawing figure for purposes of simplicity.

FIG. 11 is a right-facing transverse sectional view of the halves of the injection mold used to make the third embodiment of the present invention, taken along the line 11-11 shown in FIG. 10.

FIG. 12 is a left-facing transverse sectional view of the halves of the injection mold used to make the third embodiment of the present invention, taken along the line 12-12 shown in FIG. 10.

FIG. 13 is a side view of stacked caps of a fourth embodiment of the present invention.

FIG. 14 is a view of a bottom or second face of a cap of the fourth embodiment of the present invention, taken along the line 14-14 shown in FIG. 13.

FIG. 15 is a view of a top or first face of a cap of the fourth embodiment of the present invention, taken along the line 15-15 shown in FIG. 13.

FIG. 16 is an upward-looking view of one of the halves of the injection mold used to make the fourth embodiment of the present invention, and with injection passageways and ejector pins being omitted in the drawing figure for purposes of simplicity. The downward-looking view of the other of the halves of the injection mold used to make the fourth embodiment is substantially similar to the view shown in FIG. 16.

FIG. 17 is a right-facing transverse sectional view of the halves of the injection mold used to make the fourth embodiment of the present invention, similar to the view of FIG. 11.

FIG. 18 is a is a left-facing transverse sectional view of the halves of the injection mold used to make the third embodiment of the present invention, similar to the view of FIG. 12.

FIG. 19 is a side sectional view of the cap of the fourth embodiment of the invention being used to hold a covering such as roofing paper to a board with a staple therethrough.

FIG. 20 is a side view of stacked caps of a fifth embodiment of the present invention.

FIG. 21 is a view of a bottom or second face of a cap of the fifth embodiment of the present invention shown in FIG. 20.

FIG. 22 is a view of a top or first face of a cap of the fifth embodiment of the present invention shown in FIG. 20.

FIG. 23 is an upward-looking view of one of the halves of the injection mold used to make the fifth embodiment of the present invention, and with injection passageways and ejector pins being omitted in the drawing figure for purposes of simplicity. The downward-looking view of the other of the halves of the injection mold used to make the fifth embodiment is substantially similar to the view shown in FIG. 23.

FIG. 24 is a right-facing transverse sectional view of the halves of the injection mold used to make the fifth embodiment of the present invention, similar to the view of FIG. 17.

FIG. 25 is a left-facing transverse sectional view of the halves of the injection mold used to make the fifth embodiment of the present invention, similar to the view of FIG. 18.

DETAILED DESCRIPTION OF THE INVENTION

Referring to FIGS. 1-4, the first embodiment 20 of the present invention is seen to be a plurality of stacked fastener caps 22, with each cap having a cap body 24. Each cap 22 is substantially identical to each other cap 22, so that a description of one suffices for all, except that the end caps only have a single connecting stem (hereinafter described) because the end caps only have an adjacent cap on one side and not the other. Cap body 24 is preferably about 0.070 inches (1.8 mm) thick and has a top or first face 26 on one side and a bottom or second face 28 on a second side spaced from the first face 26, and preferably one or both of first or second faces 26, 28 are substantially planar, although one or both of first or second faces may have a slight peripheral perpendicular "draft" or ridge portion 27 (described hereinbelow) extending from the face, it being understood that this ridge portion 27 is not considered to make the first or second face substantially non-planar. The cap body 24 has a perimeter 30 joining the first face 26 to the second face 28. While each cap 22 is shown as a circular disc, preferably about 0.978 inches (2.48 mm) in diameter so as to fit in standard-sized cap magazines, it shall be understood that other shapes, such as rounded rectangles, may be used for the caps 22 of the present invention. Such rounded rectangle shapes are shown, for example, in Lamb, U.S. Design Pat. D593, 391 (issued Jun. 2, 2009), fully included herein by reference.

Adjacent faces 26, 28 of adjacent caps 22 are joined by at least one connecting stem 32, preferably axially disposed in the center of the caps as shown, and preferably about 0.025 inches (0.64 mm) in diameter. Each stem 32 needs to be sufficiently flexible so as to allow the stacked caps to compress together when placed in the magazine of a nailer, and also needs to be shearable so that, when the bottommost cap of the stack is pushed into nailing position from the magazine, the stem 32 will shear or break to free the bottommost cap from the stack. The length of each stem 32, and thus the gap between adjacent caps 22 when the stack is not compressed, is preferably about 0.060 inches (1.5 mm). As later explained hereinbelow, the common feature of all embodiments of the present invention is that all embodiments have at least one connecting stem (e.g., stem 32) joining adjacent faces of adjacent caps.

FIG. 3 is a simplified sectional view of the first and second halves 34, 36 of the injection mold 38 used to make the first embodiment 20 of the present invention, and is shown separated with the caps removed. It shall be understood that well-known injection passageways and ejector pins are omitted from the drawing figures of the injection mold for purposes of simplicity. In a manner well-known to those skilled in the art, each of the halves of the injector mold preferably has well-known injector pins (not shown) for ejecting the molded caps from the mold, and the operation of the injector pins of one half of the injection mold is sequenced with the operation of the injector pins of the other half of the injection mold so that the caps are first ejected from one half of the mold and then from the other so that the connecting stems of the caps do not shear as might happen if some caps were ejected from one half of the mold while other of the caps remained in the other half of the mold. Additionally, to reduce the shearing of the caps during ejection, preferably each cap of all embodiments has a slight "draft" or ridge portion 27 on one side of the cap so that the cap is better retained into one half of the injection mold during ejection than in the other half of the injection mold. Each half of the injection mold respectively has a plurality of semi-circular cavities 40, 42 that together, when the injection mold is closed, form a circular cavity for molding the bodies 24 of caps 22. Each half of the injection mold respectively further has a semi-circular channel 44, 46 that together, when the injection mold is closed, form a circular passageway between adjacent cavities 40, 42 to create the connecting stems 32. Preferably, one of the halves of the injection mold has a recessed cavity 48 for forming the ridge portion 27 of each cap in the mold.

In contrast to prior art stacked cap assemblies, the assembly 20 of stacked caps 22, as with all embodiments, is integrally molded by injection molding, with all caps in the assembly and the connecting stems being integrally molded as a unit. Preferably there may be 55 caps in each stack to match the magazine size of existing nailers, but it shall be understood that the injection mold can accommodate making more or fewer caps in each stack simply by changing the number of cavities 40, 42 provided in the mold. Preferably the plastic used to mold all embodiments of the stacked caps 22 is well-known High-Density Polyethylene ("HDPE") plastic, and a filler may be added to the plastic to ensure that the connecting stems 32 shear properly without excessive stretching. Because the stacked assembly 20 is integrally molded as a unit, no manual assembly of individual caps into a sled is required during manufacture, and the stacked assembly 20 is ready to be packaged for sale when it is ejected from the injection mold.

As a variant on the present invention, a second embodiment cap 22' is shown in FIG. 5. The only difference between second embodiment cap 22' and first embodiment cap 22 is that second embodiment cap 22' has a plurality of connecting stems 32' between adjacent caps 22', shown in FIG. 5 as three connecting stems 32' between adjacent caps 22'. It shall be understood that the plurality of connecting stems 32' can be of other numbers, such as two or more than three, other than just three as shown in FIG. 5. It shall be understood that the third, fourth, and fifth embodiments, hereinafter described, can also, in like manner as the second embodiment, have a plurality of connecting stems between adjacent caps.

FIG. 6 shows the first and second mold halves 34', 36', of the injection mold 38' used to make the second embodiment cap 22'. The only difference between first and second mold halves 34', 36' and first and second mold halves 34, 36 is that first and second mold halves 34', 36' respectively have a plurality of semi-circular channels 44', 46' for forming the plurality of connecting stems 32'.

Referring to FIGS. 7-25 of the drawings, third, fourth, and fifth preferred embodiments of the present invention are shown. There are many similarities between the various embodiments, and only the differences between the embodiments will be discussed in detail, it being understood that similar structure for the various embodiments serves similar purpose. The reference numerals for the various parts of the third, fourth, and fifth embodiments shall be understood to have a prefix identifying the particular embodiment (e.g., "3.", "4.", "5.") and a suffix identifying the particular structure (e.g., "20", etc.) similar to the un-prefixed reference numerals of the first embodiment, such that reference numerals with the same suffix are understood to be similar structure particular to each of the different embodiments (e.g., "3.20", "4.20", "5.20").

Referring to FIGS. 7-12, the third embodiment 3.20 of the present invention is seen to be a plurality of stacked fastener caps 3.22, with each cap having a cap body 3.24. Each cap 3.22 is substantially identical to each other cap 3.22, so that a description of one suffices for all, except that the end caps only have a single connecting stem (hereinafter described) because the end caps only have an adjacent cap on one side and not the other. The substantial difference between the first embodiment 20 and the third embodiment 3.20 is that the third embodiment has a convex top or first face 3.26 and a concave bottom or second face 3.28. Cap body 3.24 is preferably about 0.070 inches (1.8 mm) thick and has a first face 3.26 on one side and a second face 3.28 on a second side spaced from the first face 3.26, and the concavity displacement of second face 3.28 at the center is preferably about 0.030 inches (0.76 mm). As with all embodiments, one or both of first or second faces may have a slight peripheral perpendicular "draft" or ridge portion 3.27 extending from the face. The cap body 3.24 has a perimeter 3.30 joining the first face 3.26 to the second face 3.28.

Adjacent faces 3.26, 3.28 of adjacent caps 3.22 are joined by at least one connecting stem 3.32, preferably axially disposed in the center of the caps as shown, and preferably about 0.025 inches (0.64 mm) in diameter. Each stem 3.32 needs to be sufficiently flexible so as to allow the stacked caps to compress together when placed in the magazine of a nailer, and also needs to be shearable so that, when the bottommost cap of the stack is pushed into nailing position from the magazine, the stem 3.32 will shear or break to free the bottommost cap from the stack. The length of each stem 3.32, and thus the gap between adjacent caps 3.22 when the stack is not compressed, is preferably about 0.060 inches (1.5 mm).

FIG. 10 is a simplified sectional view of the first and second halves 3.34, 3.36 of the injection mold 3.38 used to make the third embodiment 3.20 of the present invention, and is shown separated with the caps removed. It shall be understood that well-known injection passageways and ejector pins are omitted from the drawing figures of the injection mold for purposes of simplicity. In a manner well-known to those skilled in the art, each of the halves of the injector mold preferably has well-known injector pins (not shown) for ejecting the molded caps from the mold, and the operation of the injector pins of one half of the injection mold is sequenced with the operation of the injector pins of the other half of the injection mold so that the caps are first ejected from one half of the mold and then from the other so that the connecting stems of the caps do not shear as might happen if some caps were ejected from one half of the mold while other of the caps remained in the other half of the mold. Additionally, to reduce the shearing of the caps during ejection, preferably each cap of the third embodiment has a slight "draft" or ridge portion 3.27 on one side of the cap so that the cap is better retained into one half of the injection mold during ejection than in the other half of the injection mold. Each half of the injection mold respectively has a plurality of semi-circular cavities 3.40, 3.42 that together, when the injection mold is closed, form a circular cavity for molding the bodies 3.24 of caps 3.22. Each half of the injection mold respectively further has a semi-circular channel 3.44, 3.46 that together, when the injection mold is closed, form a circular passageway between adjacent cavities 3.40, 3.42 to create the connecting stems 3.32. Preferably, one of the halves of the injection mold has a recessed cavity 3.48 for forming the ridge portion 3.27 of each cap in the mold.

Referring to FIGS. 13-18, the fourth embodiment 4.20 of the present invention is seen to be a plurality of stacked fastener caps 4.22, with each cap having a cap body 4.24. Each cap 4.22 is substantially identical to each other cap 4.22, so that a description of one suffices for all, except that the end caps only have a single connecting stem (hereinafter described) because the end caps only have an adjacent cap on one side and not the other. The substantial difference between the first embodiment 20 and the fourth embodiment 4.20 is that the third embodiment has a transverse groove that is a flat midportion 4.50 across the bottom or second face 4.28 so as to raise the underside of the cap from the covering being secured to a building's surface, thereby providing retaining tension by the cap to the covering when a fastener holds the cap to the building's surface, as hereinafter described and as shown in FIG. 18. Cap body 4.24 is preferably about 0.070 inches (1.8 mm) thick at first and second thicker portions 4.52, 4.54 outside of transverse groove 4.50 and about 0.035 inches (0.9 mm) thick within transverse groove 4.50 and has a top or first face 4.26 on one side and a second or bottom face 4.28 on a second side spaced from the first face 4.26. As with all embodiments, one or both of first or second faces may have a slight peripheral perpendicular "draft" or ridge portion 4.27 extending from the face. The cap body 4.24 has a perimeter 4.30 joining the first face 4.26 to the second face 4.28.

Adjacent faces 4.26, 4.28 of adjacent caps 4.22 are joined by at least one connecting stem 4.32, preferably axially disposed in the center of the caps as shown, and preferably about 0.025 inches (0.64 mm) in diameter. Each stem 4.32 needs to be sufficiently flexible so as to allow the stacked caps to compress together when placed in the magazine of a nailer, and also needs to be shearable so that, when the bottommost cap of the stack is pushed into nailing position from the magazine, the stem 4.32 will shear or break to free the bottommost cap from the stack. The length of each stem 4.32 is preferably about 0.095 inches (2.4 mm), and thus the gap between adjacent caps 4.22 when the stack is not compressed, is preferably about 0.060 inches (1.5 mm) at first and second thicker portions 4.52, 4.54.

FIG. 16 is an upward-looking view of one of the halves 4.34 of the injection mold 4.38 used to make the fourth embodiment 4.20 of the present invention. The downward-looking view of the other of the halves 4.36 of the injection mold 4.38 used to make the fourth embodiment is substantially similar to the view shown in FIG. 16. It shall be understood that well-known injection passageways and ejector pins are omitted from the drawing figures of the injection mold for purposes of simplicity. In a manner well-known to those skilled in the art, each of the halves of the injector mold 4.38 preferably has well-known injector pins (not shown) for ejecting the molded caps from the mold, and the operation of the injector pins of one half of the injection mold is sequenced with the operation of the injector pins of the other half of the injection mold so that the caps are first ejected from one half of the mold and then from the other so that the connecting stems of the caps do not shear as might happen if some caps were ejected from one half of the mold while other of the caps remained in the other half of the mold. Additionally, to reduce the shearing of the caps during ejection, preferably each cap of the third embodiment has a slight "draft" or ridge portion 4.27 on one side of the cap so that the cap is better retained into one half of the injection mold during ejection than in the other half of the injection mold. Each half of the injection mold respectively has a plurality of semi-circular cavities 4.40, 4.42 that together, when the injection mold is closed, form a circular cavity for molding the bodies 4.24 of caps 4.22. Each half of the injection mold respectively further has a semi-circular channel 4.44, 4.46 that together, when the injection mold is closed, form a circular passageway between adjacent cavities 4.40, 4.42 to create the connecting stems 4.32. Preferably, one of the halves of the injection mold has a recessed cavity 4.48 for forming the ridge portion 4.27 of each cap in the mold.

FIG. 19 shows one of the fourth embodiment caps 4.20 holding a covering 56, such as roofing paper, to a board 60 of a building.

Referring to FIGS. 20-25, the fifth embodiment 5.20 of the present invention is seen to be a plurality of stacked fastener caps 5.22, with each cap having a cap body 5.24. Each cap 5.22 is substantially identical to each other cap 5.22, so that a description of one suffices for all, except that the end caps only have a single connecting stem (hereinafter described) because the end caps only have an adjacent cap on one side and not the other. The substantial difference between the fourth embodiment 4.20 and the fifth embodiment 5.20 is that, rather than having a transverse groove 4.50 along one bottom face like the fourth embodiment 4.20, the fifth embodiment has a "bow tie" cross section as shown, with first or top face 5.26 and bottom or second face 5.28 both having a substantially flat transverse midportion or groove 5.50 that angles upwardly at about 3.81 degrees to thicker first and second outer portions 5.52, 5.54 that are not as broad as the first and second outer portions 4.52, 4.54 of the fourth embodiment. This structure makes the fifth embodiment reversible, such that regardless of which face of the cap is adjacent to the covering on a building, the downwardly-facing transverse midportion or groove 5.50 raises the underside of the cap from the covering being secured to a building's surface, thereby providing retaining tension by the cap to the covering when a fastener holds the cap to the building's surface. Cap body 5.24 is preferably about 0.070 inches (1.8 mm) thick at first and second thicker outer portions 5.52, 5.54 outside of transverse midportion 5.50 and about 0.020 inches (0.5 mm) thick within transverse groove 5.50 and has a top or first face 5.26 on one side and a second or bottom face 5.28 on a second side spaced from the first face 5.26. As with all embodiments, one or both of first or second faces may have a slight peripheral perpendicular "draft" or ridge portion 5.27 extending from the face. The cap body 5.24 has a perimeter 5.30 joining the first face 5.26 to the second face 5.28.

Adjacent faces 5.26, 5.28 of adjacent caps 5.22 are joined by at least one connecting stem 5.32, preferably axially disposed in the center of the caps as shown, and preferably about 0.025 inches (0.64 mm) in diameter. Each stem 5.32 needs to be sufficiently flexible so as to allow the stacked caps to compress together when placed in the magazine of a nailer, and also needs to be shearable so that, when the bottommost cap of the stack is pushed into nailing position from the magazine, the stem 5.32 will shear or break to free the bottommost cap from the stack. The length of each stem 5.32 is preferably about 0.040 inches (2.4 mm), and thus the gap between adjacent caps 5.22 when the stack is not compressed, is preferably about 0.060 inches (1.0 mm) at first and second thicker portions 5.52, 5.54.

FIG. 23 is an upward-looking view of one of the halves 5.34 of the injection mold 5.38 used to make the fifth embodiment 5.20 of the present invention. The downward-looking view of the other of the halves 5.36 of the injection mold 5.38 used to make the fifth embodiment is substantially similar to the view shown in FIG. 23. It shall be understood that well-known injection passageways and ejector pins are omitted from the drawing figures of the injection mold for purposes of simplicity. In a manner well-known to those skilled in the art, each of the halves of the injector mold 5.38 preferably has well-known injector pins (not shown) for ejecting the molded caps from the mold, and the operation of the injector pins of one half of the injection mold is sequenced with the operation of the injector pins of the other half of the injection mold so that the caps are first ejected from one half of the mold and then from the other so that the connecting stems of the caps do not shear as might happen if some caps were ejected from one half of the mold while other of the caps remained in the other half of the mold. Additionally, to reduce the shearing of the caps during ejection, preferably each cap of the third embodiment has a slight "draft" or ridge portion 5.27 on one side of the cap so that the cap is better retained into one half of the injection mold during ejection than in the other half of the injection mold. Each half of the injection mold respectively has a plurality of semi-circular cavities 5.40, 5.42 that together, when the injection mold is closed, form a circular cavity for molding the bodies 5.24 of caps 5.22. Each half of the injection mold respectively further has a semi-circular channel 5.44, 5.46 that together, when the injection mold is closed, form a circular passageway between adjacent cavities 5.40, 5.42 to create the connecting stems 5.32. Preferably, one of the halves of the injection mold has a recessed cavity 5.48 for forming the ridge portion 5.27 of each cap in the mold.

To use the stacked assembly of caps of all embodiments of the present invention, the stacked assembly of caps is inserted into the magazine of a nailer just as with prior art caps. The well-known pusher of the nailer pushes the bottommost cap from the stack and into nailing position, thereby shearing the connecting stem between the bottommost cap and its adjacent cap thereabove. A fastener, such as the staple 60 shown in FIG. 19, is forcibly placed by the well-known nailer through the cap and covering 58 over a board 60 of a building, thereby causing the cap to secure the covering to the board.

Although the present invention has been described and illustrated with respect to a preferred embodiment and a preferred use therefor, it is not to be so limited since modifications and changes can be made therein which are within the full intended scope of the invention.

I claim:

1. A plurality of stacked plastic fastener caps, each said cap of said plurality of stacked caps having a cap body, said cap body having a first face and a second face spaced from said first face, said cap body having a perimeter joining said first face and said second face, with adjacent faces of adjacent caps of said plurality of caps being joined by at least one centrally axially-disposed connecting stem; said at least one connecting stem being an integral unit with said adjacent caps, in which said cap body has first and second thicker portions and a transverse groove interposed between said first and second thicker portions, said transverse groove extending from one portion of a perimeter of said first or second faces to an opposed portion of said perimeter of said first or second faces along a diameter of said at least one of said first or second faces.

2. A plurality of stacked plastic fastener caps, each said cap of said plurality of stacked caps having a cap body, said cap body having a first face and a second face spaced from said first face, said cap body having a perimeter joining said first face and said second face, with adjacent faces of adjacent caps of said plurality of caps being joined by at least one centrally axially-disposed connecting stem; said at least one connecting stem being an integral unit with said adjacent caps, in which said cap body has first and second thicker portions and a transverse groove interposed between said first and second thicker portions, said transverse groove extending from one portion of a perimeter of said first and second faces to an opposed portion of said perimeter of said first and second faces along a diameter of said first and second faces.

* * * * *